United States Patent
Öhman et al.

(10) Patent No.: US 8,486,224 B2
(45) Date of Patent: *Jul. 16, 2013

(54) METHOD FOR SEPARATING LIGNIN FROM BLACK LIQUOR

(75) Inventors: Fredrik Öhman, Gavle (SE); Hans Theliander, Gothenburg (SE); Per Tomani, Huddinge (SE); Peter Axegard, Solna (SE)

(73) Assignee: LignoBoost AB, Stockholm (SE)

( * ) Notice: Subject to any disclaimer, the term of this patent is extended or adjusted under 35 U.S.C. 154(b) by 1489 days.

This patent is subject to a terminal disclaimer.

(21) Appl. No.: 11/659,733

(22) PCT Filed: Sep. 8, 2005

(86) PCT No.: PCT/SE2005/001301
§ 371 (c)(1),
(2), (4) Date: May 8, 2007

(87) PCT Pub. No.: WO2006/031175
PCT Pub. Date: Mar. 23, 2006

(65) Prior Publication Data
US 2008/0047674 A1 Feb. 28, 2008

(30) Foreign Application Priority Data
Sep. 14, 2004 (SE) .................................. 0402201-8

(51) Int. Cl.
- C07G 1/00 (2011.01)
- C08H 7/00 (2011.01)
- C08L 97/00 (2006.01)
- D21C 1/00 (2006.01)

(52) U.S. Cl.
USPC .......................................... 162/16; 530/500

(58) Field of Classification Search
USPC .............................................. 530/500; 162/16
See application file for complete search history.

(56) References Cited

U.S. PATENT DOCUMENTS 1,394,151 A * 10/1921 Dickerson ..................... 530/506
1,606,338 A * 11/1926 Bradley et al. .................. 162/90

(Continued)

FOREIGN PATENT DOCUMENTS

| GB | 664811 | 1/1992 |
| WO | WO 9006964 | 6/1990 |
| WO | WO2004013409 A1 | 2/2004 |

OTHER PUBLICATIONS

Li et al. (Journal of Polymer Science: Part B: Polymer Physics, vol. 35, 1899-1970, 1997).*

(Continued)

Primary Examiner — Liam Heincer
(74) Attorney, Agent, or Firm — Young & Thompson

(57) ABSTRACT

Method for separating lignin from black liquor includes the following steps: a) precipitating lignin by acidifying black liquor and thereupon dewatering, b) suspending the lignin filter cake obtained in step a) to obtain a second lignin suspension and adjusting the pH level to approximately that of the washing water of step d) below, c) dewatering of the second lignin suspension, d) adding washing water and performing a displacement washing at substantially constant conditions without any dramatic gradients in the pH, and e) dewatering the lignin cake produced in step d) into a high dryness and displacing the remaining washing liquid in the filter cake, whereby a lignin product is obtained which has an even higher dryness after the displacement washing of step d). The lignin product or an intermediate lignin product obtained by the method, and its use, preferably for the production of heat or chemicals is also disclosed.

16 Claims, 3 Drawing Sheets

The method according to the first aspect of the invention, incorporating the washing process, for lignin separation from black liquor. The washing process is applied in the "Re-slurry tank".

U.S. PATENT DOCUMENTS

| Patent No. | | Date | Inventor | Class |
|---|---|---|---|---|
| 1,981,176 | A * | 11/1934 | Howard | 530/500 |
| 2,248,978 | A * | 7/1941 | Francisco | 530/208 |
| 2,371,136 | A * | 3/1945 | Harmon | 530/500 |
| 2,406,867 | A * | 9/1946 | Tomlinson, Jr. et al. | 530/500 |
| 2,453,213 | A * | 11/1948 | Farber | 530/500 |
| 2,464,828 | A * | 3/1949 | Pollak et al. | 530/500 |
| 2,470,764 | A * | 5/1949 | Dunbar | 162/14 |
| 2,541,058 | A | 2/1951 | Heritage et al. | |
| 2,576,418 | A * | 11/1951 | Salvesen et al. | 530/500 |
| 2,671,751 | A * | 3/1954 | Jennison et al. | 435/277 |
| 2,680,113 | A * | 6/1954 | Adler et al. | 530/500 |
| 2,710,255 | A * | 6/1955 | Van Blaricom et al. | 162/16 |
| 2,727,028 | A * | 12/1955 | Byrd et al. | 530/500 |
| RE24,213 | E * | 9/1956 | Blaricom et al. | 162/16 |
| 2,772,965 | A * | 12/1956 | Gray et al. | 162/14 |
| 2,801,168 | A * | 7/1957 | Goddard | 162/16 |
| 2,828,297 | A * | 3/1958 | Giesen | 530/500 |
| 2,949,448 | A * | 8/1960 | Toppel | 530/500 |
| 2,976,273 | A * | 3/1961 | Ball et al. | 530/506 |
| 2,994,633 | A * | 8/1961 | Clark | 162/16 |
| 2,997,466 | A * | 8/1961 | Ball et al. | 530/500 |
| 3,048,576 | A * | 8/1962 | Ball et al. | 530/500 |
| 3,148,177 | A * | 9/1964 | Wiley et al. | 530/500 |
| 3,428,520 | A * | 2/1969 | Yiannos | 162/38 |
| 3,509,121 | A * | 4/1970 | Julius | 530/500 |
| 3,546,200 | A * | 12/1970 | Tokoli et al. | 530/507 |
| 3,806,403 | A * | 4/1974 | Ferguson | 162/16 |
| 3,829,388 | A * | 8/1974 | Lange et al. | 252/180 |
| 3,895,996 | A | 7/1975 | Lange et al. | |
| 4,111,928 | A * | 9/1978 | Holsopple et al. | 530/507 |
| 4,155,804 | A * | 5/1979 | Edge, Jr. | 162/16 |
| 4,470,876 | A * | 9/1984 | Beaupre et al. | 162/16 |
| 4,493,797 | A * | 1/1985 | Avedesian | 530/507 |
| 4,740,591 | A * | 4/1988 | Dilling et al. | 530/505 |
| 4,764,596 | A * | 8/1988 | Lora et al. | 530/507 |
| 4,971,658 | A * | 11/1990 | Henricson et al. | 162/21 |
| 5,034,094 | A * | 7/1991 | Kurple | 162/16 |
| 5,061,343 | A * | 10/1991 | Azarniouch et al. | 162/16 |
| 5,188,673 | A * | 2/1993 | Clausen et al. | 127/37 |
| 5,288,857 | A | 2/1994 | Aarsrud et al. | |
| 5,478,366 | A * | 12/1995 | Teo et al. | 44/301 |
| 5,635,024 | A | 6/1997 | Shall | |
| 5,728,264 | A * | 3/1998 | Pangalos | 162/48 |
| 5,773,590 | A * | 6/1998 | Hart | 530/500 |
| 5,777,086 | A * | 7/1998 | Klyosov et al. | 530/500 |
| 5,788,812 | A | 8/1998 | Agar et al. | |
| 5,811,527 | A | 9/1998 | Ishitoku et al. | |
| 6,172,204 | B1 * | 1/2001 | Sarkanen et al. | 530/500 |
| 6,183,598 | B1 * | 2/2001 | Myreen | 162/29 |
| 6,420,533 | B1 * | 7/2002 | Lightner | 530/500 |
| 6,632,327 | B1 * | 10/2003 | Shall | 162/29 |
| 2002/0059994 | A1 * | 5/2002 | Kurple | 162/29 |
| 2002/0129910 | A1 * | 9/2002 | Lightner | 162/16 |
| 2003/0221804 | A1 * | 12/2003 | Lightner | 162/16 |
| 2008/0051566 | A1 * | 2/2008 | Ohman et al. | 530/500 |
| 2008/0214796 | A1 * | 9/2008 | Tomani et al. | 530/500 |
| 2009/0038212 | A1 * | 2/2009 | Cooper | 44/550 |

OTHER PUBLICATIONS

Davy M F, et al., "Economic Evaluation of Black Kiquor Treatment Processes for Incremental Kraft Pulp Production"83 RD Annual Meeting of the Technical SE Part A; Montreal, Canada. Jan. 28-31, 1997; ISSN 0316-6732; p. 2, col. 1.

Ohman F, et al., "Filtration Properties of Lignin Precipitated From B Lack Liquor"; International Chemical Recovery Conference; Whistler, BC, Canada Jun. 11-14, 2001. AN E200143669598.

Sep. 11, 2007 European search report in corresponding EP application.

* cited by examiner

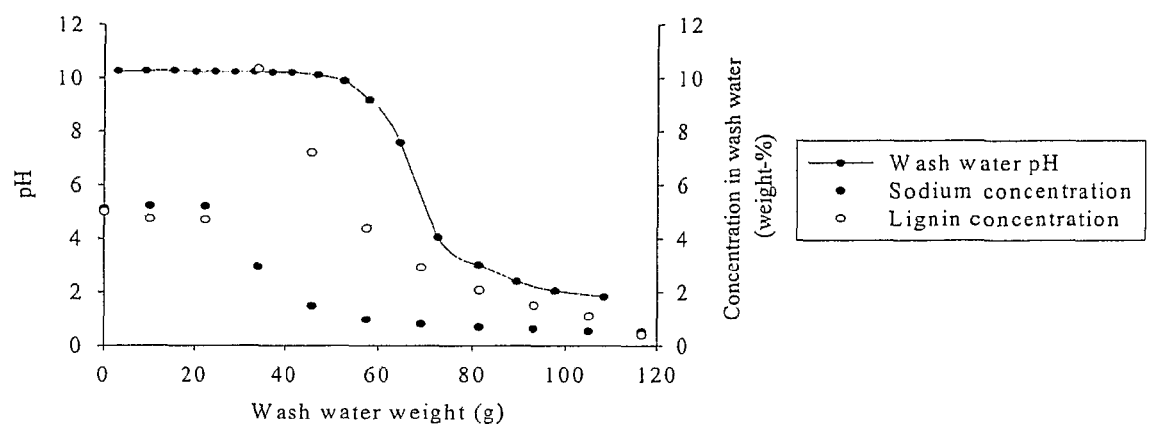
Figure 1. Sodium and lignin concentrations and pH-profile for the washing of a lignin filtered directly after the precipitation stage.

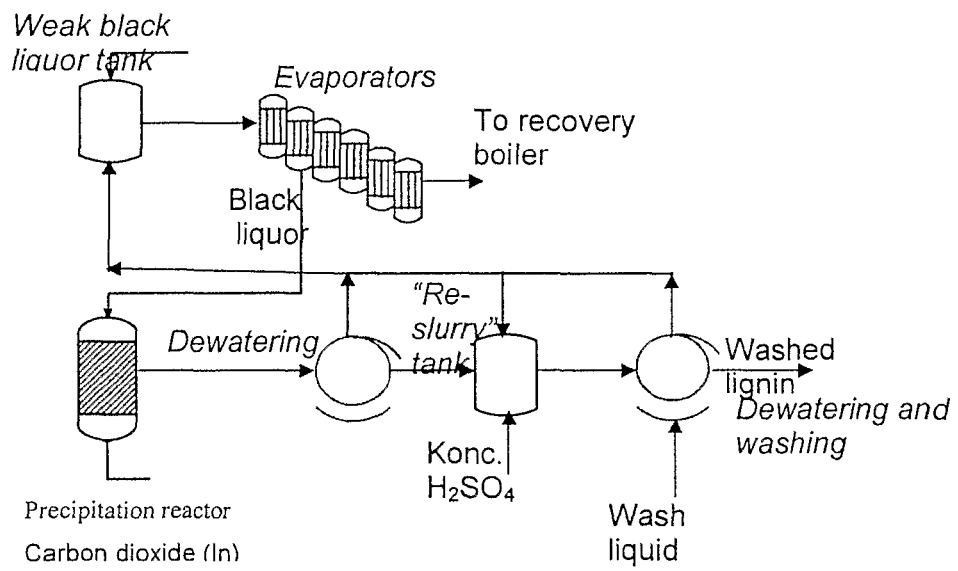
Figure 2. The method according to the first aspect of the invention, incorporating the washing process, for lignin separation from black liquor. The washing process is applied in the "Re-slurry tank".

Figure 3. Material balance for example 3 given in the text. Instead of air in filter press 2, hot flue gases can be used. The recirculation of wash liquor is 708 t/d.
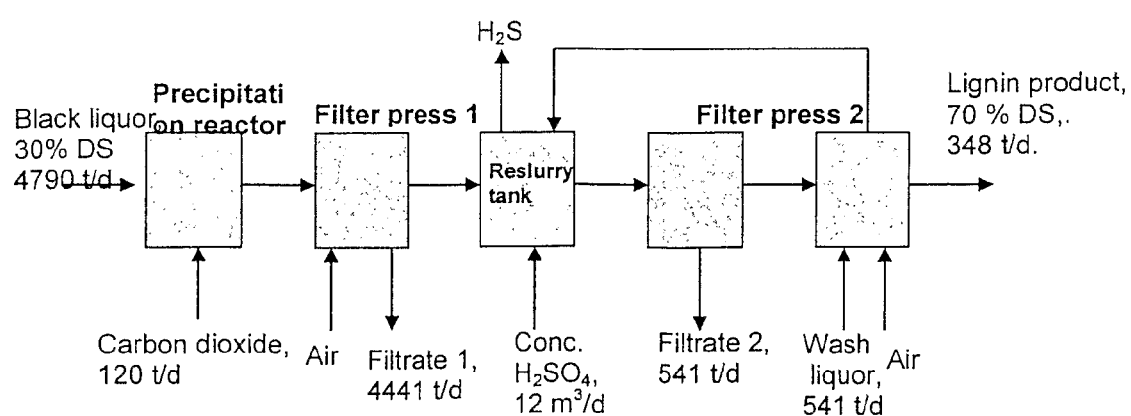

METHOD FOR SEPARATING LIGNIN FROM BLACK LIQUOR

BACKGROUND OF THE INVENTION

1. Field of the Invention

This invention concerns the technical field of lignin separation. In particular the present invention relates to a method for lignin separation from spent cooking liquor, called black liquor. Further the invention relates to a lignin product obtainable by the above mentioned method and use of said product.

2. Description of Related Art

In a modern, energy-optimized pulp mill, there is a surplus of internally generated energy. With today's modern processes, bark can be exported while the remaining energy surplus, in the form of mixtures comprising other burnable residues, is burned in the recovery boiler, with a relatively low efficiency, especially with regard to electricity production. There is also often a problem because the heat transfer capacity in the recovery boiler is a narrow sector, a so called bottleneck, which limits the production of pulp in the mill. The recovery boiler is further the most expensive (instrument) unit in the pulp mill.

To separate lignin from black liquor is an interesting solution to these problems. In this way, the energy surplus can be withdrawn from the process in the form of a solid biofuel and can be exported to e.g. a power station, where the fuel can be used more efficiently than in the recovery boiler of the pulp mill. This lignin is also a valuable material for production of "green chemicals". A further alternative to energy production is to use the extracted lignin as chemical feedstock. Further, lignin extraction leaves a black liquor for combustion with a lower thermal value, which in turn leads to a lower load on the recovery boiler. This gives in a short term perspective possibilities for increased pulp production. In the long term perspective lower instrument costs for the recovery boiler are expected.

There are several possible procedures for such a separation, and industrial applications have been known for a long time. Already in 1944, Tomlinson and Tomlinson Jr were granted a patent for improvements to such a method. The separation method used today is to acidify the black liquor so that the lignin is precipitated in the form of a salt. The solid phase is separated from the liquor and can thereafter be cleaned or modified. There are industrial applications in operation today where lignin is separated from black liquor for use as special chemicals. One example of such a process is the precipitation of lignin from black liquor by acidification with carbon dioxide. The suspension is taken to a storage vessel for conditioning of the precipitate after which the solid lignin is separated and washed (with acidic wash water) on a band filter, and is finally processed to the desired state.

However, if the separated lignin is to be used for fuel the demands on cleanliness and properties are completely different from those when the application is for use as a special chemical. A successful washing of the precipitated lignin is very important, to obtain a lignin fuel with a reasonably low ash content and a low tendency to cause corrosion and to be able to return as much as possible of the cooking chemicals to the chemicals recovery unit. Also important is to minimize filtering resistance in order to minimize filtering area as well as promote possibilities to reach a high dry solid content for the lignin production.

In laboratory studies of such a separation mentioned above (which also is found in our experimental part) the result was in some cases a "pure" lignin (sufficiently clean for qualified fuel usage), but relatively large problems arose through blockage of the filter cake. The flow of wash water was reduced to almost zero in some tests. In other tests, an uneven washing of the filter cake occurred with high concentrations of inorganic substances (primarily sodium) in the lignin as a result. These problems could be reduced, as was found during the course of the experiment, by washing with highly acidic washing water (pH=1) in order to obtain the quickest possible reduction of the pH in the filter cake. On an industrial scale, however, such a procedure leads to a very high consumption of acid and accordingly a such procedure is very inefficient.

Accordingly, there is a need for a method where lignin can be separated using small amounts of acid whereby an essentially pure lignin product is obtained which can e.g. be used as fuel or for the production of chemicals. Further it would be desirable that said method achieves a lignin product suitable for use as fuel with reasonably low ash content and a low tendency to cause corrosion.

SUMMARY OF THE INVENTION

The present invention solves one or more of the above problems by providing according to a first aspect a method for separation of lignin, using small amounts of acid whereby an essentially pure lignin product is obtained which can be used as fuel or for the production of chemicals and has a reasonably low ash content and a low tendency to cause corrosion, from black liquor comprising the following steps:
  a) Precipitation of lignin by acidifying black liquor (which in itself is a lignin suspension) and thereupon dewatering,
  b) suspending the lignin filter cake whereupon a second lignin suspension is obtained and adjusting the pH level to approximately the pH level of the washing water of step d) below,
  c) dewatering of the second lignin suspension,
  d) addition of washing water and performing a displacement washing at more or less constant conditions without any dramatic gradients in the pH, and
  e) dewatering of the filter cake produced in step d) into a high dryness and displacement of the remaining washing liquid in said filter cake, whereby a lignin product is obtained which has an even higher dryness after the displacement washing of step d).

The present invention also provides a lignin product or an intermediate lignin product obtainable by the method according to the first aspect. The present invention also provides according to a third aspect use, preferably for the production of heat or chemicals, of the lignin product or the intermediate lignin product of the second aspect. In this way the lignin may be kept stable during the washing course with a more even result as a result thereof due to avoidance of clogging in the filter cake/medium. The method of the first aspect is further illuminated in FIG. 2. The method avoids re-dissolution of lignin and subsequent blockage of the filter cake.

BRIEF DESCRIPTION OF THE DRAWING FIGURES

FIG. 1 shows sodium and lignin concentrations and pH-profile for the washing of a lignin filtered directed after the precipitation stage.

FIG. 2 shows the method according to the first aspect, incorporating a modified washing process, whereby lignin is precipitated from black liquor.

FIG. 3 shows material balance for the present method according to the first aspect instead of air in filter press 2, hot flue gases can be used.

DETAILED DESCRIPTION OF THE INVENTION

It is intended throughout the present description that the expression "acidifying" embraces any means for acidify the black liquor. Preferably the acidifying is performed by adding $SO_2(g)$, organic acids, HCl, $HNO_3$, carbon dioxide or sulphuric acid (in the form of fresh sulfuric acid or a so called "spent acid" from a chlorine dioxide generator) or mixtures thereof to said black liquor, most preferred by adding carbon dioxide or sulphuric acid.

It is intended throughout the present description that the expression "dewatering" embraces any means for dewatering. Preferably the dewatering is performed by using centrifugation, a filter press apparatus, a band filter, a rotary filter, such as a drum filter, or a sedimentation tank, or similar equipment, most preferred a filter press apparatus is used.

According to a preferred embodiment of the first aspect of the invention the dewatering of step a) is performed in a filter press apparatus where the filter cake may be blown through by gas or a mixture of gases, preferably flue gases, air or vapor, most preferred air or overheated vapor, in order to dispose of the remaining black liquor.

According to a preferred embodiment of the first aspect of the invention the pH level is adjusted to below approximately pH 6 in step b), preferably below approximately pH 4. The pH level is most preferred a pH from 1 to 3.5.

According to a preferred embodiment of the first aspect of the invention the washing water has a pH level of below approximately pH 6, preferably below approximately pH 4. The pH level is most preferred a pH from 1 to 3.5.

According to a preferred embodiment of the first aspect of the invention the filter cake obtained in step a) is blown through by using gas or a mixture of gases, including e.g. flue gases, air and vapor (which preferably can be air or overheated vapor) before suspending said cake as set out in step b).

According to a preferred embodiment of the first aspect of the invention the pH level adjustment is combined with an adjustment of the ion strength, preferably by using alkali metal ions or multivalent alkaline earth metal ions, most preferred calcium ions.

According to a preferred embodiment of the first aspect of the invention the pH level adjustment combined with an adjustment of the ion strength is adapted so that they correspond to the pH level and ion strength of the washing liquid. A higher ion strength gives at a given pH lower yield losses of lignin as the lignin becomes more stable.

According to a preferred embodiment of the first aspect of the invention the filtrate from the first dewatering stage step a) is re-circulated directly to a recovery system, preferably after re-alkalization.

According to a preferred embodiment of the first aspect of the invention the remaining washing liquor in the filter cake in step e) is removed with air or flue gases, preferably flue gases from a recovery boiler, a bark boiler or a lime kiln.

According to a preferred embodiment of the first aspect of the invention the washing liquor and a part of the filtrate from the second dewatering in step c) is returned to the re-slurrying stage step b) to further reduce the consumption of acid and washing liquid, i.e. water.

The method according to the first aspect of the invention solves the above mentioned problems and said method gives a more uniform result without blockage of the filter cake/medium (see FIG. 2). The central feature of said method is that the changes in the lignin particles/suspension take place before the washing, instead of during the washing process itself. As before, the lignin is precipitated from the black liquor by acidification and is then dewatered. Instead of the previous direct displacement washing, however, the filter cake is stirred into a quantity of wash water and a new slurry is obtained. In this slurry, the pH can be adjusted to correspond to the level of the wash water, as set out in the method according to the first aspect. Thereafter, the suspension is dewatered, wash water is added and a displacement washing can be carried out under more or less constant conditions without any dramatic gradients in pH or ionic strength. In this way, the lignin can be kept stable during the washing process. Changes, if any, take place in the suspension stage instead of during the washing process as set out earlier.

An alternative procedure for stabilizing the lignin during the washing as set out above earlier as a preferred embodiment of the first aspect of the present invention is, in combination with a pH-decrease, to adjust the ionic strength in the slurry stage, preferably with multivalent alkali metal ions or alkaline earth metal ions (e.g. calcium). At a given pH, a higher ionic strength in the suspension stage reduces the lignin yield losses. Here also the ionic strength and pH of the wash water preferably essentially correspond to the conditions in the slurry stage to avoid gradients during the washing process. A higher ionic strength in the slurry and in the wash water gives a stable lignin even at high pH-values. Besides making the washing easier, divalent calcium ions can be introduced into the lignin, which in the combustion of the lignin can bind sulfur in the form of calcium sulphate (Aarsrud et al 1990).

If the pH in the slurry stage is kept on the acidic side, sulfur will be released from the black liquor in the form of hydrogen sulfide- and/or sulfide ions (which in turn may end up in hydrogen sulfide ($H_2S$)). Such a sulfur separation can be useful in the pulp process in two different ways. If the hydrogen sulfide is e.g. re-absorbed in the cooking liquor before chip impregnation, a higher selectivity can be obtained in the pulp cook. Other possibilities are internal sulfuric acid or polysulfide generation.

The method according to the first aspect of the present invention may further be performed, as set out above, whereby first the lignin is precipitated with carbon dioxide or other suitable acid according to previously known methods. The suspension is then dewatered in some form of separation equipment (e.g. some form of filtration equipment, sedimentation tank, centrifugation etc). A filter press equipment where the filter cake can be pressed to a high dry content is preferable. Thereafter, air is preferably blown through the pressed filter cake in order to remove as much as possible of the remaining black liquor. In this way, the acid consumption and hydrogen sulfide formation in the subsequent re-slurry stage can be considerably reduced. The filtrate from the first dewatering stage is preferably re-circulated directly to the recovery system, possibly after re-alkalization.

Thereafter, the filter cake is again made into a slurry in a tank or similar vessel preferably equipped with a suitable stirring device and also preferably equipped with an exhaust to take care of the hydrogen sulfide formed. The new slurry is then adjusted to the desired pH and preferably also the desired ionic strength and dewatered in another, second, filter press (or apparatus of similar type or apparatus which gives a similar result as set out earlier above) where the cake is pressed to the highest possible dry content before, in the same (or similar) equipment, being washed by displacement washing, where the wash water has the same conditions as the suspension with regard to pH and ionic strength. Finally, the cake is pressed to a high dry content and the remaining washing liquor in the filter cake is removed with air or flue gases from e.g. a recovery boiler or bark boiler. The latter also makes it possible to obtain a drier lignin. The washing liquor and a part of the filtrate from the second filtration can preferably be returned to the re-slurrying stage to further reduce the consumption of acid and water.

Preferred features of each aspect of the invention are as for each of the other aspects mutandis. The prior art documents mentioned herein are incorporated to the fullest extent permitted by law. The invention is further described in the following examples in conjunction with the appended figures, which do not limit the scope of the invention in any way. Embodiments of the present invention are described in more detail with the aid of examples of embodiments and figures, the only purpose of which is to illustrate the invention and are in no way intended to limit its extent.

EXAMPLES

Example 1

Comparative

In laboratory studies of a separation of lignin according to previously known techniques as set out in the background above, lignin was precipitated from black liquor through acidification (with carbon dioxide or sulphuric acid). The suspension obtained was filtered, after which a displacement washing was carried out where the wash water was added on top of the filter cake and was pressed through it under an applied pressure. The result was in some cases a "pure" lignin (sufficiently clean for qualified usage as a fuel), but relatively large problems arose through blockage of the filter cake. The flow of wash water was reduced to almost zero in some tests. In other tests, an uneven washing of the filter cake occurred with high concentrations of inorganic substances (primarily sodium) in the lignin as a result.

These problems were shown to depend on re-dissolution of the precipitated lignin during the actual washing procedure, when the ionic strength in the solution was reduced at the same time as the pH remained high (See FIG. 1). A peak in the amount of re-dissolved lignin was observed in a region just after the breakthrough in the washing curve. The problems could be reduced, as was found out during the course of the experiment, by washing with highly acidic washing water (pH=1) in order to obtain the quickest possible reduction of the pH in the filter cake. On an industrial scale, however, such a procedure leads to a very high consumption of acid and accordingly such a procedure is very inefficient.

Example 2

The method of the first aspect of the invention, including the washing process as set out earlier, has been studied experimentally on a laboratory scale with good results, since the pH in the suspension after re-slurrying and the pH in the wash water have been kept below 4. Under these conditions, it has been possible to carry out the washing without blockage and with a very clean lignin as a result. The sodium contents in the washed lignin have varied between 0.005 per cent by weight (for pH 2 in the wash water and suspension) and 0.09 per cent by weight (for pH 3.5 in the wash water and suspension). At a pH of 4 and above in the wash water, blockages were again observed in the filter cake/medium, probably because of re-dissolved lignin which markedly reduced the flow of the wash water. Even in these cases, the sodium contents in the washed lignin could be reduced to ca. 0.25%. A number of test series have been carried out, with reproducible results.

Example 3

A further example is here given of an application of the method according to the first aspect of the invention described above (see also FIG. 3). In a pulp mill with a production of 2000 adt/day, 30% of the black liquor is taken from the evaporation at a dry content of 30%. This is acidified to pH 10 at room temperature with carbon dioxide (120 t/d) with stirring at a temperature of 80° C. The resulting slurry is dewatered in a filter press equipment, after which the filter cake is pressed and blown with air to a dry content of ca. 70%. The filtrate is returned to the recovery system of the mill. The filter cake is converted into a slurry in re-circulated washing liquor from the other filter press and is acidified further to pH 4 with sulfuric acid (96%, 12 m$^3$/d). The slurry thus obtained is dewatered in a filter press and pressed. The filtrate is returned to the mill's recovery system. Wash water is added and the lignin is washed by displacement washing (541 ton/d washing liquor at pH 4). After blowing with air, 244 t/d lignin (on a dry basis) with a sufficient cleanliness for use as a biofuel is withdrawn from the process at a dry content of 70%.

A comparison with a conventional method for removing lignin shows that the acid consumption ($CO_2$ and $H_2SO_4$) and water consumption in the ideal case lie at the same levels. A significant saving in the amount of added sulfuric acid can be achieved through recirculation of filtrate and washing liquor to the slurry stage. The fact that the amount of wash water may seem small in the example is due to the choice of more suitable equipment and not to the new method in itself. Higher dry contents can be reached in the dewatering with a filter press than with e.g. a band filter. The great difference with the new method according to the first aspect is that it offers a more uniform dewatering, which gives a considerably cleaner product. Additionally a significant amount of acid can be deducted when using said method.

In a comparison with a mill without lignin removal, there is also, in addition to the advantages mentioned above, an increased evaporation requirement. This depends largely on the fact that dry substance is removed from the black liquor, and that a larger amount of water thus needs to be evaporated to reach the same dry content to the recovery boiler, together with the added wash water. The increased evaporation requirement can, to a certain extent, be compensated for by a lower viscosity of the black liquor.

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted methods can be combined with other known methods e.g. for separating lignin from black liquor. Other aspects, advantages and modifications within the scope of the invention will be apparent to those skilled in the art to which the invention pertains.

REFERENCES

Aarsrud W., Bergstroem H. and Falkehag I (1990): "A lignin preparation and a method for its manufacture", WO 9006964

Tomlinson och Tomlinson Jr. (1944): "Improvements in the Recovery of Lignin from Black Liquor", U.S. Pat. No. 664,811

The invention claimed is:
1. A method for separation of lignin from black liquor comprising the following steps:
 a) precipitating lignin by acidifying black liquor to about a pH of 10 and thereupon dewatering to obtain a first lignin cake;
 b) suspending the first lignin cake obtained in step a) while keeping the suspension on an acidic side whereupon a second lignin suspension is obtained and adjusting a pH level to approximately the pH level of the washing water of step d) below;

c) dewatering of the second lignin suspension to obtain a second lignin cake;

d) addition of washing water and performing a displacement washing at substantially constant conditions without any dramatic gradients in the pH; and e) dewatering of the second lignin cake produced in step d) into dryness to obtain a third lignin cake and displacement of the remaining washing liquid in said third lignin cake, whereby a lignin product is obtained which has a higher dryness than after the displacement washing of step d).

2. The method according to claim 1, wherein the dewatering of step a) and/or step c) is performed in a filter press apparatus where the cake is blown through by gas, a mixture of gases, flue gases, air, vapor, or overheated vapor, in order to dispose of the remaining black liquor.

3. The method according to claim 1, wherein the pH level is adjusted to below approximately pH 6 in step b).

4. The method according to claim 1, wherein the washing water has a pH level of below approximately pH 6.

5. The method according to claim 1, wherein the filter cake obtained in step a) is blown through by gas, a mixture of gases, flue gases, air, vapor, or overheated vapor, before suspending said cake as set out in step b).

6. The method according to claim 1, wherein the pH level adjustment is combined with an adjustment of the ion strength, by using alkali metal ions, alkaline earth metal ions, or calcium ions.

7. The method according to claim 6, wherein the pH level adjustment combined with an adjustment of the ion strength corresponds to the pH level and ion strength of the washing liquid.

8. The method according to claim 1, wherein the filtrate from the first dewatering stage step a) is re-circulated directly to a recovery system.

9. The method according to claim 1, wherein the remaining washing liquor in the filter cake in step e) is removed with air, flue gases, or flue gases from a recovery boiler, a lime kiln or a bark boiler.

10. The method according to claim 1, wherein the washing liquor and a part of the filtrate from the second dewatering in step c) is returned to the re-slurrying stage step b) to further reduce the consumption of acid and water.

11. The method according to claim 1, wherein the pH level is adjusted to below approximately pH 4 in step b.

12. The method according to claim 1, wherein the pH level is adjusted to 1 to 3.5 in step b).

13. The method according to claim 1, wherein the washing water has a pH level of below approximately pH 4.

14. The method according to claim 1, wherein the washing water has a pH level of 1 to 3.5.

15. The method according to claim 1, wherein the filtrate from the first dewatering stage step a) is re-circulated directly to a recovery system after realkalization.

16. A method for separation of lignin from black liquor comprising the following steps:

a) precipitating lignin by acidifying black liquor to a pH of about 10 and thereupon dewatering to obtain a first lignin cake;

b) suspending the first lignin cake obtained in step a) while keeping the suspension acidified whereupon a second lignin suspension is obtained and adjusting a pH level to about the pH level of the washing water of step d) below;

c) dewatering the second lignin suspension to obtain a second lignin cake;

d) adding washing water and performing a displacement washing at constant conditions without any gradients in the pH; and e) dewatering of the second lignin cake produced in step d) into dryness to obtain a third lignin cake and displacement of the remaining washing liquid in said third lignin cake, whereby a lignin product is obtained which has a higher dryness than after the displacement washing of step d).

* * * * *

UNITED STATES PATENT AND TRADEMARK OFFICE
CERTIFICATE OF CORRECTION

PATENT NO.       : 8,486,224 B2                                                Page 1 of 1
APPLICATION NO. : 11/659733
DATED            : July 16, 2013
INVENTOR(S)      : Öhman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1544 days.

Signed and Sealed this
Eighth Day of September, 2015

Michelle K. Lee
*Director of the United States Patent and Trademark Office*